United States Patent
Lance et al.

(10) Patent No.: US 8,195,747 B2
(45) Date of Patent: Jun. 5, 2012

(54) USER IDENTITY BASED INSTANT MESSAGING SESSION MONITORING

(75) Inventors: John M. Lance, Littleton, MA (US); Andrew L. Schirmer, Andover, MA (US); Anuphinh Phimmasorn, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 11/306,219

(22) Filed: Dec. 20, 2005

(65) Prior Publication Data

US 2007/0143401 A1 Jun. 21, 2007

(51) Int. Cl.
G06F 15/16 (2006.01)

(52) U.S. Cl. .......... 709/206; 709/204; 709/205

(58) Field of Classification Search .......... 709/204
See application file for complete search history.

(56) References Cited

U.S. PATENT DOCUMENTS

| | | | |
|---|---|---|---|
| 6,496,851 B1 | 12/2002 | Morris | |
| 6,606,644 B1 * | 8/2003 | Ford et al. | 709/203 |
| 2002/0133550 A1 | 9/2002 | Mears et al. | |
| 2002/0138588 A1 | 9/2002 | Leeds | |
| 2003/0065721 A1 | 4/2003 | Roskind | |
| 2003/0105815 A1 * | 6/2003 | Gusler et al. | 709/204 |
| 2003/0220976 A1 * | 11/2003 | Malik | 709/206 |
| 2004/0015548 A1 * | 1/2004 | Lee | 709/204 |
| 2004/0172456 A1 | 9/2004 | Green et al. | |
| 2004/0224769 A1 * | 11/2004 | Hansen et al. | 463/40 |
| 2005/0004984 A1 | 1/2005 | Simpson | |
| 2005/0108348 A1 | 5/2005 | Lee | |
| 2007/0033250 A1 * | 2/2007 | Levin et al. | 709/204 |

* cited by examiner

*Primary Examiner* — Douglas Blair
*Assistant Examiner* — Angela Nguyen
(74) *Attorney, Agent, or Firm* — Cuenot, Forsythe & Kim, LLC

(57) ABSTRACT

A method and a system for managing communications over a network. The method can include receiving from a first user at least one user identifier associated with a second user and receiving at least one session identifier. The session identifier can correlate to a chat session on the network. Responsive to the second user posting a chat in the chat session while the first user is not currently participating in the chat session, a user notification can be generated to alert the first user that the second user has posted the chat, and to identify the chat session. The user notification can be presented to the first user via a client communicatively linked to the network.

20 Claims, 3 Drawing Sheets

USER IDENTITY BASED INSTANT MESSAGING SESSION MONITORING

FIELD OF THE INVENTION

The present invention relates to network communications and, more particularly, to instant message sessions.

BACKGROUND OF THE INVENTION

Instant messaging enables real time two-way electronic communication over a network, such as the Internet, between two or more users. When more than two users are participating in an instant messaging session, the session can become convoluted due to multiple user messages, or chats, being sent without any meaningful control over the order in which the chats are posted. For example, a first user may prompt a second user to answer a question. However, before the second user answers, a third user may post a chat to a fourth user. Thus, as comments, questions, and responses are exchanged, it frequently becomes difficult not only to follow a conversation, but also to track comments made by specific participants. This situation can become aggravated in saved/persistent chat or threaded chat environments where the chats are residual and, as a result, participants may come back at a later time and post to a chat session that has been ongoing for some time.

It therefore would be beneficial to provide a technique that improves chat communications.

SUMMARY OF THE INVENTION

The present invention relates to a method and a system for managing communications over a network. The method can include receiving from a first user a request to monitor user participation within a chat session, wherein the request specifies a second user selected from a contact list of the first user and at least one session identifier correlating to at least one chat session on the network of which the first user is not a participant. Responsive to the request, each chat session correlated with the at least one session identifier can be monitored for a chat posted by the second user. Responsive to the second user posting a chat in a selected chat session correlated to a session identifier in the request and while the first user is not a participant in the second chat session, a user notification can be generated to alert the first user that the second user has posted the chat within the selected chat session. The user notification can be presented to the first user via a client communicatively linked to the network.

The present invention also relates to a system for managing communications over a network. The system can include a chat session monitor that receives from a first user a request to monitor user participation within a chat session, wherein the request specifies a second user selected from a contact list of the first user and at least one session identifier correlating to at least one chat session on the network of which the first user is not a participant. Responsive to the request, the system can monitor each chat session correlated with the at least one session identifier for a chat posted by the second user. In response to the second user posting a chat in a selected chat session correlated to a session identifier in the request and while the first user is not a participant in the selected chat session, the chat session monitor can alert the first user via a client communicatively linked to the network that the second user has posted the chat within the selected chat session.

Another embodiment of the present invention can include a machine readable storage being programmed to cause a machine to perform the various steps described herein.

BRIEF DESCRIPTION OF THE DRAWINGS

There are shown in the drawings, embodiments which are presently preferred, it being understood; however, that the invention is not limited to the precise arrangements and instrumentalities shown.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein relate to a method and a system of managing communications over a network. In particular, a first user can select at least a second user and identify such user in a watched user list. The second user can be selected from a contact list or a buddy list of the first user, or selected by entering an identifier, for instance a user name, that identifies the second user. One or more session identifiers, each of which identifies a respective chat session or chat thread within a chat session, also can be received. The session identifiers can identify currently active chat sessions or threads in which the first user has been a participant, or any other chat sessions or threads identified by the user.

In response to the second user posting a chat in any of the chat sessions or threads correlating to the session identifiers, a notification can be generated to alert the first user that the second user has posted the chat. The notification can identify the chat session/thread in which the chat was posted and the time that the chat was posted. The notification also can identify a specific portion of the chat session/thread containing the posted chat and/or content of the posted chat. In one arrangement, the notification can include a link, such as a hyperlink, which the first user can select to open the chat session directly to the posted chat. If the first user does not desire to view the posted chat, the alert can be easily dismissed without the first user necessarily opening the chat session. In addition, the alert can provide one or more user selectable options to disable the alert, or change alert preferences.

The alert can be presented to the user via a client communicatively linked to the network. Further, the alert can be presented using any suitable communications protocol. Such protocols are known to the skilled artisan. In addition, alert functions can be integrated into existing applications or operating systems.

Figure 1:
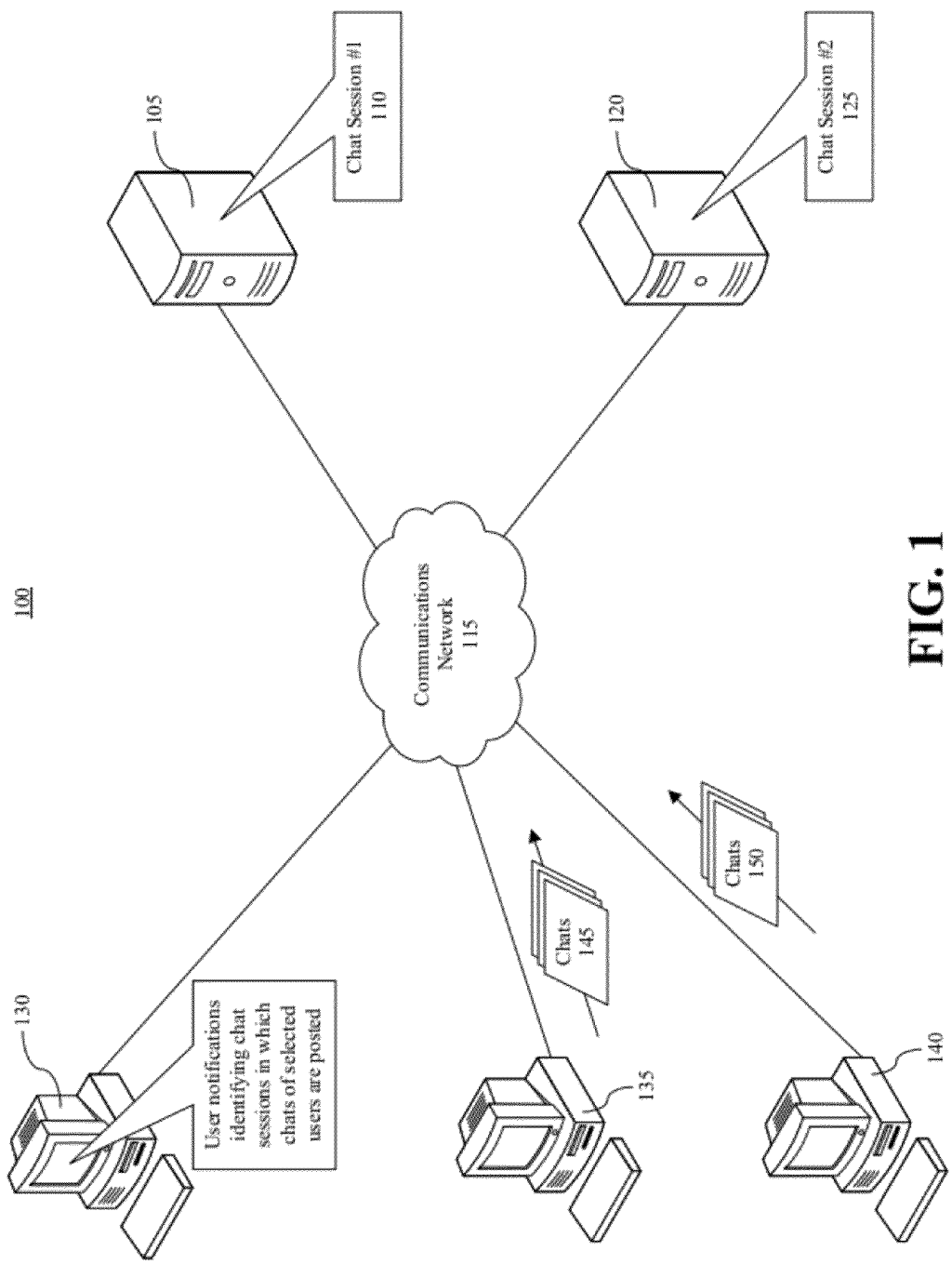
FIG. 1 is a block diagram illustrating a system for managing network communications in accordance with one embodiment of the present invention.

FIG. 1 is a block diagram illustrating a system 100 for managing network communications in accordance with one embodiment of the present invention. The system 100 can include at least a first chat server 105. The chat server 105 can be configured for hosting chat sessions, such as a first chat session 110, via a communications network 115. The communications network 115 can be local area network (LAN), a wide area network (WAN), the Internet, a cellular communications network, or any other communications network over which the chat server 105 can host the chat session 110. One or more additional chat servers, such as chat server 120, also can be provided. The additional chat servers also can be configured for hosing chat sessions over the communications network 115. For instance, the chat server 120 can host a second chat session 125.

The system 100 also can include a first client 130 and one or more additional clients 135, 140 communicatively linked to the first chat server 105 and/or the second chat server 120 via the communications network 115. The clients 130, 135, 140 can be, for example, computers, mobile communication devices, such as mobile telephones or personal digital assistants (PDAs), network appliances, gaming consoles, or any other devices which can communicate with the chat servers 105, 120 via the communications network 115.

In operation, a user of the first client 130 can identify one or more users, such as respective users of the second and third clients 135, 140, who the first user wishes to track. Session identifiers identifying the first chat session 110, the second chat session 125 and/or threads within the chat sessions 110, 125 also can be received. The first user can associate user identifiers for the first user and/or the second user with one or more of the session identifiers. For example, if the first user wishes to track the second user in the first and second chat sessions 110, 125, a user identifier for the second user can be associated with the session identifiers for the first and second chat sessions 110, 125. If the first user also wishes to track the third user, but only in the first chat session, a user identifier for the third user can be associated with the session identifier for the first chat session 110. The first chat session 110 then can be monitored to identify one or more chats 145, 150 generated by the first and second users that are posted in the first chat session 110, and the second chat session 125 can be monitored to identify one or more chats 145 generated by the first user. In response to such chats 145, 150 being posted, user notifications can be can be generated to alert the first user of the postings.

In one arrangement, the first user can select to monitor selected users to be tracked in all available chat sessions or threads, or only in particular chat sessions or threads. The first user also can select to monitor all users in particular chat sessions or threads, or to monitor all users in all chat sessions/threads. Still, a myriad of selectable options can be provided to the first user and the invention is not limited in this regard.

Figure 2:
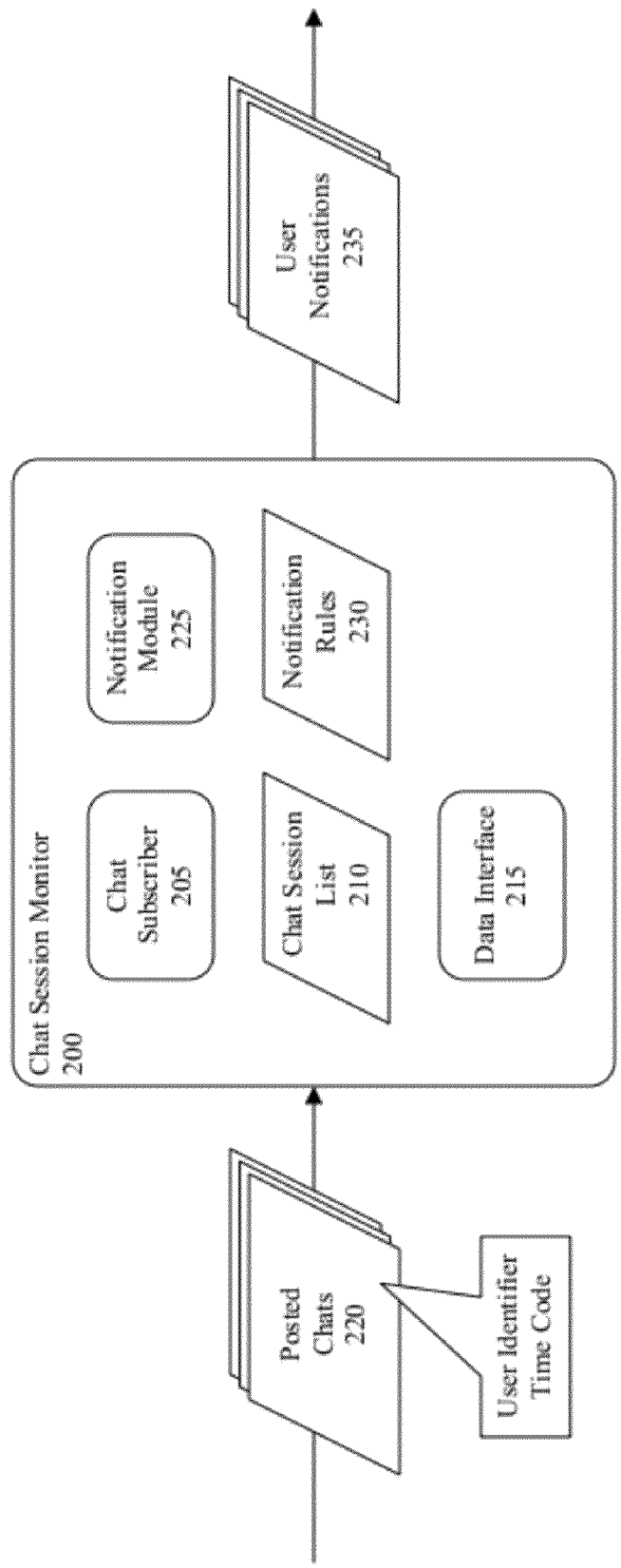
FIG. 2 is a flow diagram for managing network communications in accordance with an embodiment of the present invention.

Referring to FIG. 2, a chat session monitor 200 can be used to monitor the chat sessions 110, 125. The chat session monitor 200 can include a chat subscriber 205 that subscribes to chat sessions, such as the first and second chat sessions. For instance, the chat subscriber 205 can establish a user session with the first and/or second chat servers. Session tracking or similar processes can be used to maintain session affinity between the chat subscriber 205 and the chat servers, for example using session cookies or in any other suitable manner. In one arrangement, a persistent data store can be used during the session to store session information without the use of cookies. For instance, the session identifier (sessionID) can be held in a uniform resource locator (URL). Other session information also can be held in this manner.

The chat session monitor 200 also can include a chat session list 210. The chat session list 210 can include the user identifiers correlating to the identified users. The chat session list 210 also can include the user identifier of the first user requesting the user/chat session tracking. In the chat session list 210, the user identifiers can be associated with the session identifiers to identify the chat sessions/threads in which users are to be tracked, and to identify who is requesting the tracking.

The user identifiers and session identifiers can be entered into the chat session list 210 via a data interface 215. For example, the data interface 215 can interface with the contact list and/or buddy list (hereinafter collectively referred to as "contact list") of the first user to receive selections by the first user of other users to be tracked or to deactivate tracking of other users. For instance, a user selectable "buddy watch" option can be provided in the contact list. The "buddy watch" can be a user selectable radio button, check box, or any other suitable menu item associated with contacts. Additional selectable options can be provided in the contact list change tracking options.

When chat tracking is applied to a contact, the contact list can indicate such tracking. For example, an icon representing the contact can be presented in a manner that is recognizably different than icons representing untracked contacts. For instance, the radio button or check box can indicate such tracking, or any other suitable tracking indicator can be provided. In one embodiment, the tracking indicator can indicate whether the tracked user is being tracked in all chat sessions, or only in specific chat sessions. In the case that the tracked user is being tracked only in specific chat sessions, icons can be presented to indicate which chat sessions. If the tracked user is being tracked in many such chat sessions, an icon correlating to a first of the chat sessions can be presented with a drop-down menu that contains additional icons for the other chat sessions in which the user is tracked.

In one arrangement, the first user's contact list can be automatically updated with all names from saved chats to which the first user has access, if the names do not already exist in the contact list. The names can be added as a separate dynamic group, for instance "Other Saved Chat Buddies". A separate grouping for such names can help to keep the contact list free from clutter, while still enabling the first user to set chat alerts for any such other users without having to manually add them to the contact list.

Notably, use of the "buddy watch" is not limited to contact lists and buddy lists. For example, a "buddy watch" option can be provided in any other application. An example of such an application can be an e-mail client. For instance, a "buddy watch" menu item can be provided in the menu of the mail client. The "buddy watch" menu item can be selected to add to a list of users to be tracked a user identifier associated with a received e-mail or an e-mail that is sent. The user identified to be tracked in this manner can be tracked in all available chat sessions or threads, or the first user can be prompted to select particular chat sessions or threads in which to track the identified user.

The session identifiers also can be received from the first user, or generated based on chat sessions in which the first user has participated. Nonetheless, it should be noted that the invention is not limited with respect to the manner in which data is entered into the chat session list 210. Indeed, the data interface 215 can receive the user and session data any other suitable manner. For instance, the data interface 215 can receive text or spoken utterances from the first user. Speech recognition (not shown) can be implemented to translate spoken utterances into user/session identifiers that can be maintained in the chat session list 210. The chat session list 210 can comprise a data table, a text file, or any other data file suitable for storing the chat session identifiers and the user identifiers.

The chat subscriber 205 can receive posted chats 220 for chat sessions or threads being monitored (e.g. chat sessions or chat threads identified in the chat session list 210) and track data correlating to the chat sessions/threads. For example, the chat subscriber 205 can parse the posted chats to determine the user identifier associated with each chat, to determine in which chat session the posted chat was posted, and to provide a content indicator that indicates the content of the chat. The content indicator can include a selected portion of the chat, such as the first words of the chat or the first sentence of the chat, or any other desired chat content. Other information also can be parsed from the chat. For example, the posted chat 220 also can include an identifier of a data repository on which the posted chat 220 resides. In addition, the chat subscriber 205 also can track the time that each posted chat 220 was posted. Accordingly, the chat subscriber 205 can identify the chronological position of each chat within a particular chat session, and thus the portion of the chat session containing the posted chat.

A notification module 225 can compare the user identifier in each posted chat 220 and the corresponding chat session against the chat session list 210. A determination can be made as to whether the posted chat corresponds to a user being tracked for that chat session. If so, the notification module 225 can compare the user identifier corresponding to the user posting the chat, the session identifier and/or the user identifier of the tracking user to notification rules 230. The notification module 225 also can reference the notification rules 230 to determine whether the user requesting the chat session tracking should receive notification of the posted chat. The notification module 225 can process the various data resulting from the comparisons/determinations to determine whether to generate a user notification 235.

For example, if the user posting the posted chat 220 and the chat session in which the chat 220 was posted correspond to user and session identifiers that the first user wishes to track, but the first user is not granted access to the data repository on which the posted chat 220 resides, the notification module 225 can determine that the user notification 235 should not be sent. In addition, if the user is not granted access to track one or more of the users who he is attempting to track, the notification module can determine that a user notification 235 should not be sent. However, if the first user is granted access to the chat session and the data repository, and the first user has permission to track the user being tracked, the notification module 225 can propagate the user notification 235 to the first user.

Each user who potentially may be tracked in the chat sessions may be provided an option to select whether they wish to be tracked, an option to identify users for whom they give permission to perform tracking, and/or an option to identify users to be blocked from tracking attempts. Still, other user selectable tracking options can be provided and the invention is not limited in this regard.

In accordance with one embodiment of the present invention, user identifiers and session identifiers can be validated with the notification rules 230 prior to being added to the chat session list 210. Thus, if the first user attempts to enter a user identifier for a user who the first user does not have permission to track, the notification module 225 can deny entry of the user identifier into the chat list 210, and forward a notification to the first user that the user does not have permission to track the identified user. Similarly, if the first user is not granted access to the chat session identified by the session identifier, or the first user does not have access to the data repository where the chats in that chat session are posted, the session identifier can be denied entry into the chat session list 210, and a notification can be forwarded to the first user indicating that the first user does not have access to the chat session.

In another example, the notification module can determine if the first user is logged into the chat session. If so, the notification module can reference user preferences of the first user, which can be represented in the notification rules 230, to determine whether the first user desires to receive user notifications for chat sessions into which the first user is already logged. If not, the notification module 225 can determine that the user notification 235 should not be sent. It should be noted that there are a myriad of other examples of notification rules 230 that can be applied, and the invention is not limited in this regard.

The chat session monitor 200 can be communicatively linked to the chat servers and at least one of the clients. For example, referring again to FIG. 1, the chat session monitor 200 can reside on the first client 130, either of the chat session servers 105, 120, or any other node of the communications network 115. Moreover, although the chat session monitor is shown in FIG. 2 as being realized in a centralized fashion, the chat session monitor 200 also can be realized in a distributed fashion where different elements are spread across several interconnected processing systems.

Figure 3:
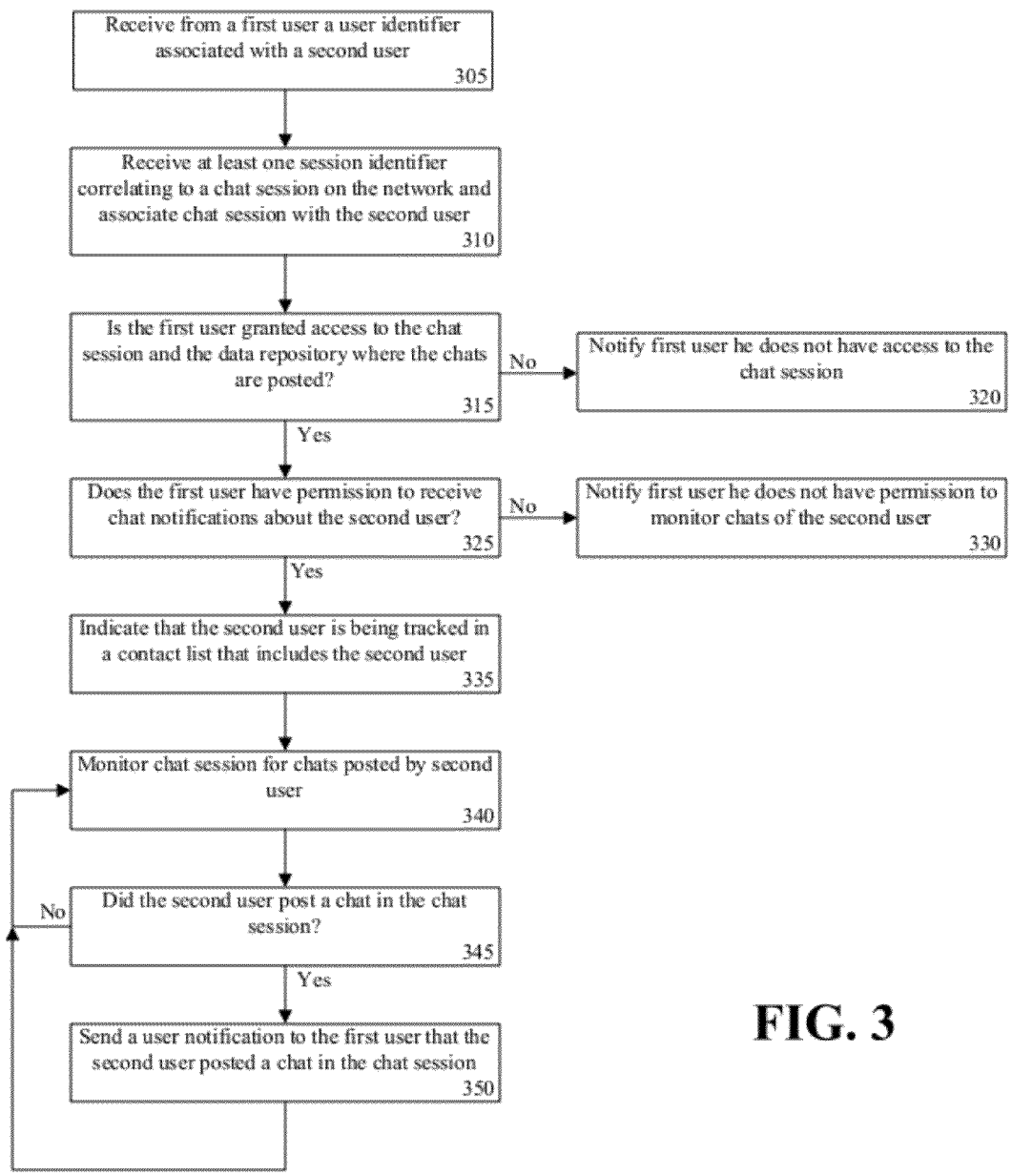
FIG. 3 is a flowchart illustrating one aspect of managing network communications in accordance with the inventive arrangements disclosed herein.

FIG. 3 is a flowchart illustrating one aspect of managing network communications in accordance with the inventive arrangements disclosed herein. Beginning at step 305, a user identifier associated with a second user can be received from a first user. At step 310, at least one session identifier correlating to a chat session can be received and associated with the second user. Additional session identifiers correlating to other chat sessions also can be entered and associated with the second user. Further, additional user identifiers can be entered, for example for a third user, and each of those user identifiers can be associated with one or more chat sessions using session identifiers.

At decision box 315, a determination can be made as to whether the first user is granted access to the chat sessions correlating to the session identifiers, and whether the user is granted access to the data repositories where chats for the respective chat sessions are stored. If the first user is denied access to any of the chat sessions or the data repositories, a notification can be sent to the first user indicating such denial, as shown in step 320. For instance, if the first user is denied access to one or more identified chat sessions, the notification can indicate to the first user the chat sessions to which access is denied. If the first user is denied access to one or more data repositories, the notification can indicate to the first user the data repositories for which data access is denied, and the respective session identifiers for the chat sessions that post data to those data repositories.

If the first user does have access to one or more of the chat sessions and respective data repositories, the process can proceed to decision box 325 where a determination is made whether the first user has permission to receive chat notifications about the second user. If the first user does not have the permission, at step 330 the first user can be notified that he does not have permission to monitor the chats of the second user.

If the first user is granted access to the chat sessions and respective data repositories, and has permission to track the second user, the process can continue to step 335 where an indication can be presented in the contact list that includes the second user, for instance the first user's contact list, that the second user is being tracked. At step 340 the chat session can be monitored for chat postings by the second user. Referring to decision box 345 and step 350, if the second user post a chat in the chat session, a user notification can be sent to the first user indicating such posting. As noted, the notification can include an identifier of the chat session or chat thread, a portion of the chat session/thread containing the posted chat, the content of the posted chat, the time of the post, a link which the first user can select to open the chat session directly at the posted chat, and/or any other information related to the second user, the chat session/thread, and/or the posted chat. Referring again to step 340, session monitoring can continue. The first user can select to stop monitoring at any time in any suitable manner, for example by selecting a menu item in the user notification 235, or by selecting a menu item in an operating system or application, to turn off chat monitoring.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway. The term "uniform resource identifier" (URI), as used herein, is an identifier of a network resource.

This invention can be embodied in other forms without departing from the spirit or essential attributes thereof. Accordingly, reference should be made to the following claims, rather than to the foregoing specification, as indicating the scope of the invention.

What is claimed is:

1. A method of managing communications over a network, comprising:
   receiving from a first user a request to monitor user participation within a chat session, wherein the request specifies a second user selected from a contact list of the first user and at least one session identifier correlating to at least one chat session on the network, and the first user is not logged into the chat session nor viewing the chat session;
   responsive to the request, monitoring each chat session correlated with the at least one session identifier for a chat posted by the second user;
   responsive to the second user posting a chat in a selected chat session correlated to a session identifier in the request and while the first user is not logged into, nor viewing, the selected chat session, determining whether the first user is granted access to a data repository on which the posted chat resides and alerting the first user via a client communicatively linked to the network that the second user has posted the chat within the selected chat session only if the first user has access to the data repository; and
   automatically updating the contact list of the first user with names from each chat session correlated with the at least one session identifier.

2. The method of claim 1, further comprising:
   responsive to the second user posting the chat, identifying a specific portion of the identified chat session containing the posted chat.

3. The method of claim 1, further comprising:
   responsive to the second user posting the chat, providing a content indicator that indicates content of the posted chat.

4. The method of claim 1, further comprising:
   responsive to the second user posting the chat, providing a time indicator that indicates a time that the posted chat was posted.

5. The method of claim 1, wherein said step of alerting the first user comprises sending a respective identifier for each currently active chat session in which the first user has been a participant.

6. The method of claim 1, wherein the step of alerting the first user further comprises:
   determining whether the second user has allowed the first user to receive an alert that the second user has posted the chat; and
   alerting the first user that the second user has posted the chat only if the second user has allowed the first user to receive the alert.

7. The method of claim 1, further comprising visually distinguishing each contact for which participation within at least one chat session is being monitored from each contact not being monitored within a contact list of the first user.

8. The method of claim 1, further comprising:
   automatically updating a contact list of the first user with names from saved chats to which the first user has access if the names do not already exist in the contact list.

9. The method of claim 7, wherein said step of visually distinguishing further comprises, for each contact for which participation within at least one chat session is being monitored, visually indicating whether more than one chat session is being monitored for the contact.

10. A machine readable storage device, wherein the device is not a signal, having stored thereon a computer program having a plurality of code sections, that when executed by a computer cause the computer to perform the steps of:

receiving from a first user a request to monitor user participation within a chat session, wherein the request specifies a second user selected from a contact list of the first user and at least one session identifier correlating to at least one chat session on the network, and the first user is not logged into the chat session nor viewing the chat session;

responsive to the request, monitoring each chat session correlated with the at least one session identifier for a chat posted by the second user;

responsive to the second user posting a chat in a selected chat session correlated to a session identifier in the request and while the first user is not logged into, nor viewing, the selected chat session, determining whether the first user is granted access to a data repository on which the posted chat resides and alerting the first user via a client communicatively linked to the network that the second user has posted the chat within the selected chat session only if the first user has access to the data repository; and automatically updating the contact list of the first user with names from each chat session correlated with the at least one session identifier.

11. The machine readable storage device of claim 10, further causing the computer to perform the step of identifying a specific portion of the identified chat session containing the posted chat in response to the second user posting the chat.

12. The machine readable storage device of claim 10, further causing the computer to perform the step of providing a content indicator that indicates content of the posted chat in response to the second user posting the chat.

13. The machine readable storage device of claim 10, further causing the computer to perform the step of providing a time indicator that indicates a time that the posted chat was posted in response to the second user posting the chat.

14. The machine readable storage device of claim 10, wherein the step of alerting the first user comprises sending a respective identifier for each currently active chat session in which the first user has been a participant.

15. The machine readable storage device of claim 10, wherein the step of alerting the first user further comprises:
determining whether the second user has allowed the first user to receive an alert that the second user has posted the chat; and
alerting the first user that the second user has posted the chat only if the second user has allowed the first user to receive the alert.

16. The machine readable storage device of claim 10, further causing the computer to perform the step of visually distinguishing each contact for which participation within at least one chat session is being monitored from each contact not being monitored within a contact list of the first user.

17. The machine readable storage device of claim 10, further causing the computer to perform the step of automatically updating a contact list of the first user with names from saved chats to which the first user has access if the names do not already exist in the contact list.

18. The machine readable storage device of claim 16, wherein the step of visually distinguishing further comprises, for each contact for which participation within at least one chat session is being monitored, visually indicating whether more than one chat session is being monitored for the contact.

19. A system for managing communications over a network, comprising:
a machine readable storage device, wherein the device is not a signal, having stored thereon a computer program having a plurality of code sections for a chat session monitor; and
a processor that executes the chat session monitor, wherein the chat session monitor;
receives from a first user a request to monitor user participation within a chat session, wherein the request specifies a second user selected from a contact list of the first user and at least one session identifier correlating to at least one chat session on the network, and the first user is not logged into the chat session nor viewing the chat session;
responsive to the request, monitors each chat session correlated with the at least one session identifier for a chat posted by the second user;
responsive to the second user posting a chat in a selected chat session while the first user is not logged into, nor viewing, the selected chat session, determines whether the first user is granted access to a data repository on which the posted chat resides and alerts the first user via a client communicatively linked to the network that the second user has posted the chat within the selected chat session only if the first user has access to the data repository; and
automatically updates the contact list of the first user with names from each chat session correlated with the at least one session identifier.

20. The system of claim 19, wherein the chat session monitor identifies a specific portion of the identified chat session containing the posted chat in response to the second user posting the chat.

* * * * *